No. 11,826. Reissued May 22, 1900.

F. V. WHYLAND.

SWAGING MACHINE.

(Application filed Mar. 22, 1900.)

4 Sheets—Sheet 1.

Witnesses:
Chas. H. Smith
J. Stair

Inventor:
Frank V. Whyland
per L. H. Sewell & Son Attys

No. 11,826. Reissued May 22, 1900.

F. V. WHYLAND.

SWAGING MACHINE.

(Application filed Mar. 22, 1900.)

4 Sheets—Sheet 2.

Witnesses:
Chas. H. Smith
J. Stair.

Inventor:
Frank V. Whyland
per L. W. Serrell & Son Attys

No. 11,826. Reissued May 22, 1900.

F. V. WHYLAND.

SWAGING MACHINE.

(Application filed Mar. 22, 1900.)

4 Sheets—Sheet 3.

Witnesses:
Chas. H. Smith
J. Stair

Inventor:
Frank V. Whyland
per L. W. Serrell & Son, Atty.

No. 11,826. Reissued May 22, 1900.

F. V. WHYLAND.

SWAGING MACHINE.

(Application filed Mar. 22, 1900.)

4 Sheets—Sheet 4.

Witnesses:
Chas. H. Smith
J. Stair.

Inventor:
Frank V. Whyland
per L. K. Serrell & Son
Attys.

UNITED STATES PATENT OFFICE.

FRANK VINCENT WHYLAND, OF SALISBURY, CONNECTICUT, ASSIGNOR, BY MESNE ASSIGNMENTS, TO ASBURY LESTER, OF NEW YORK, N. Y.

SWAGING-MACHINE.

SPECIFICATION forming part of Reissued Letters Patent No. 11,826, dated May 22, 1900.

Original No. 629,838, dated August 1, 1899. Application for reissue filed March 22, 1900. Serial No. 9,820.

*To all whom it may concern:*

Be it known that I, FRANK VINCENT WHYLAND, a citizen of the United States, residing at Salisbury, in the county of Litchfield and State of Connecticut, have invented certain new and useful Improvements in Swaging-Machines, of which the following is a specification, reference being had to the accompanying drawings, in which—

Figure 1:
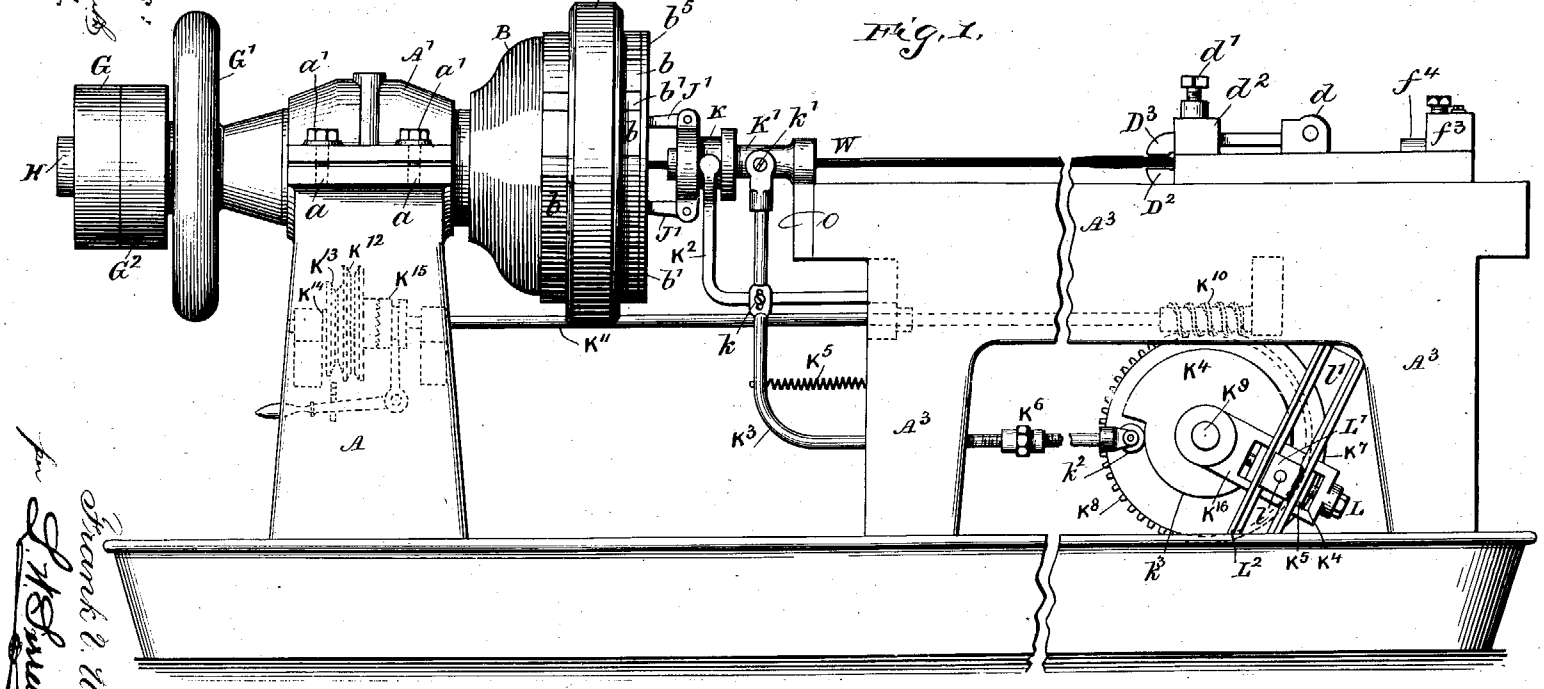
Figure 2:
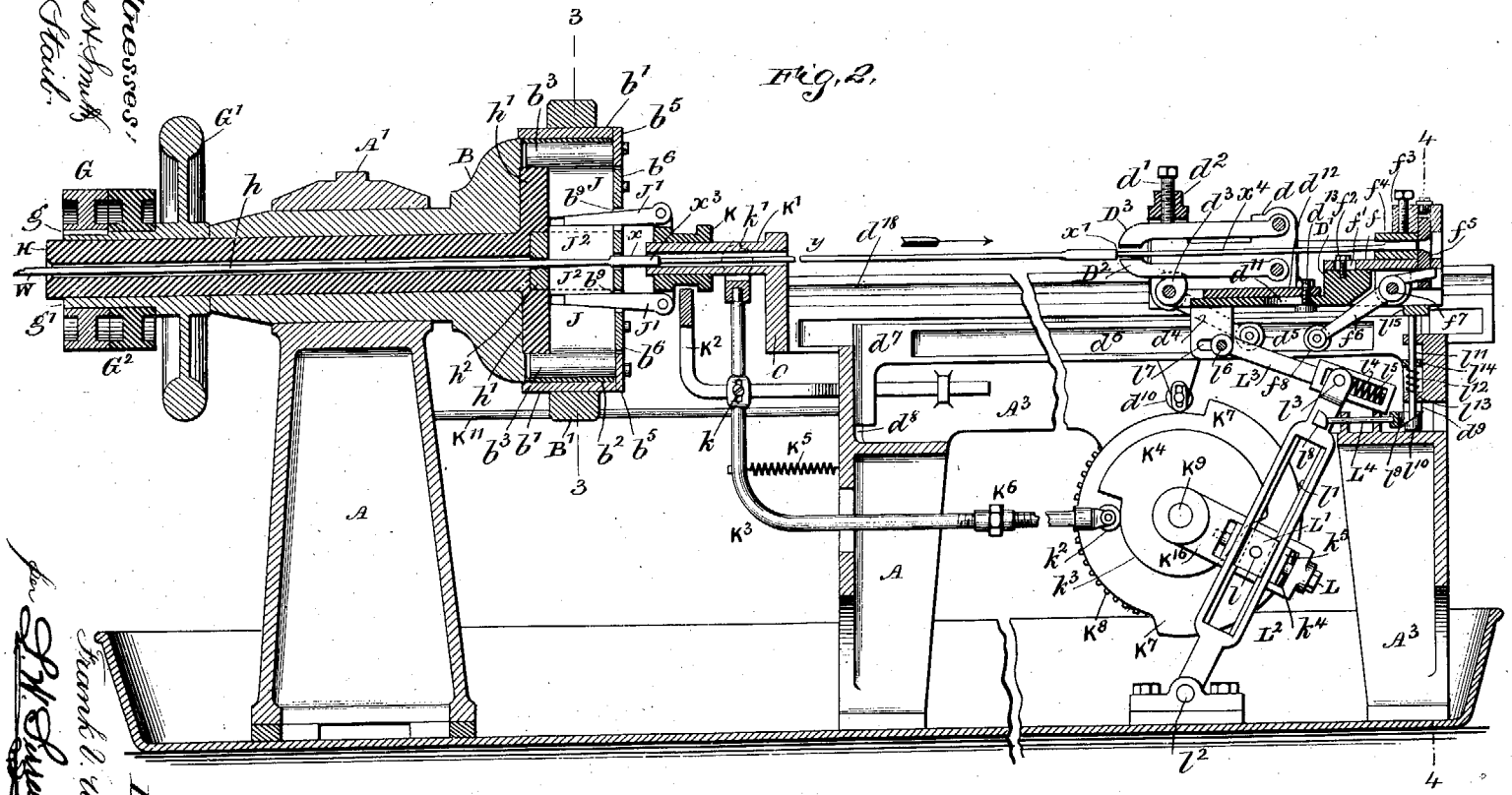
Figure 4:
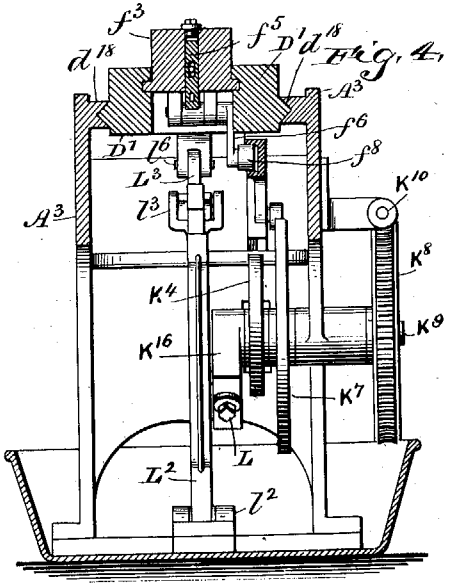
Figure 5:
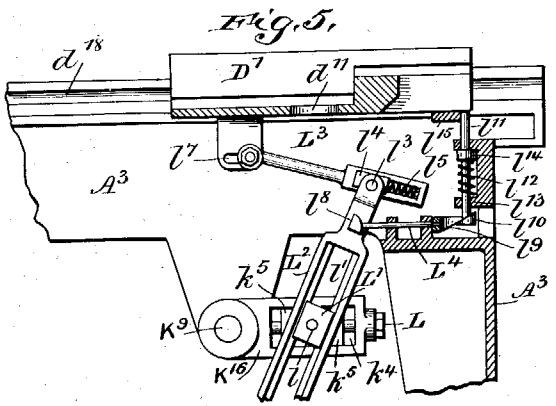
Figure 3:
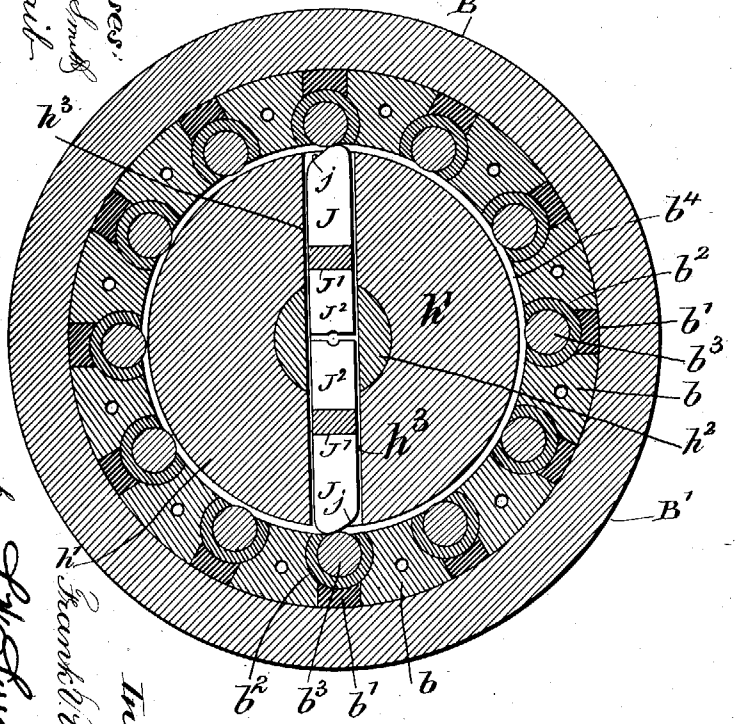
Figures 6, 7, 8, 9, 10:
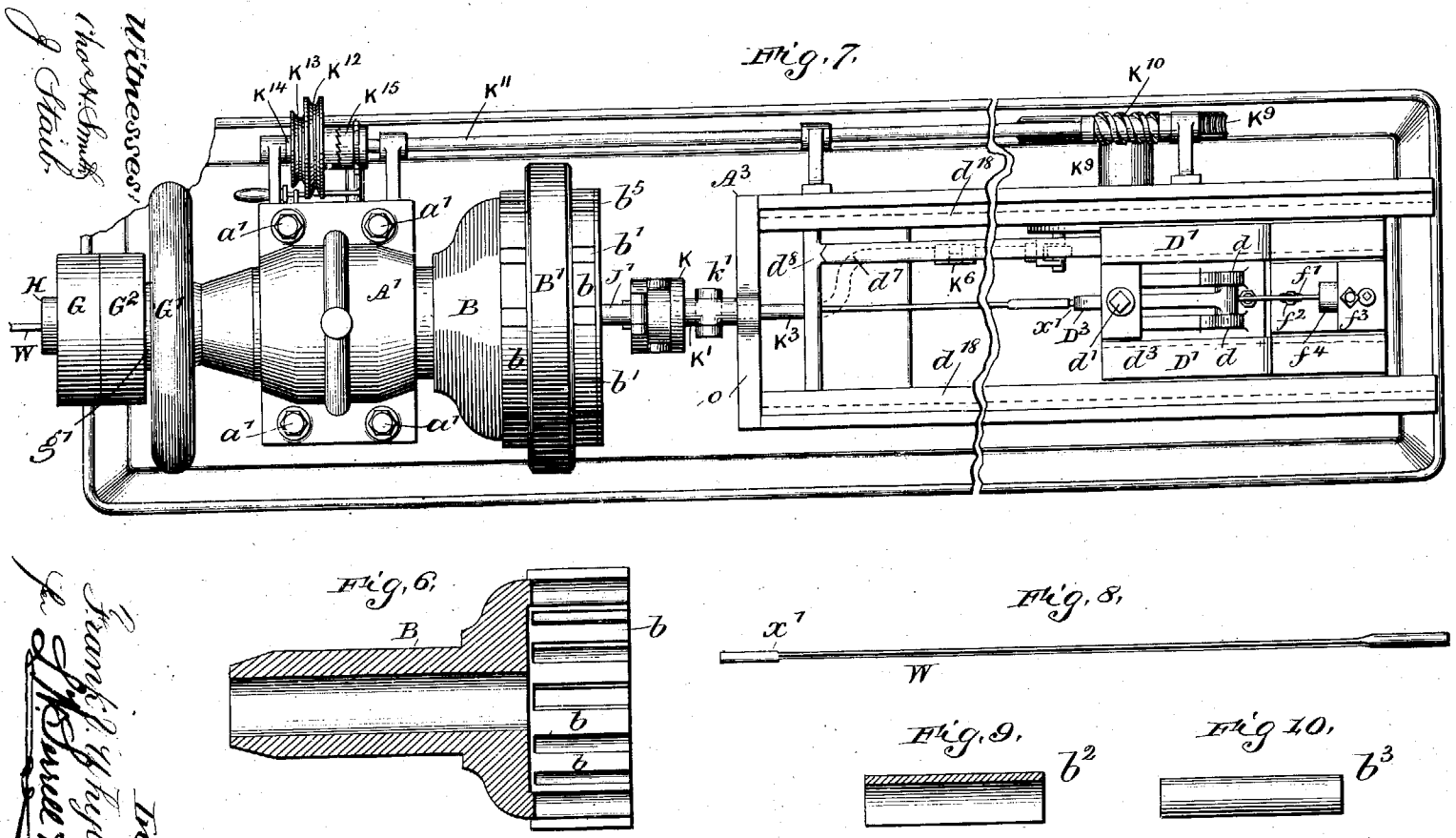

Figure 1 is a side view of my machine. Fig. 2 is a vertical central lengthwise section of the machine. Fig. 3 is a vertical cross-section of the swaging-head on line 3 3 of Fig. 2. Fig. 4 is a vertical cross-section taken through the line 4 4 of Fig. 2. Fig. 5 is an elevation partly in section, showing the stop-motion. Fig. 6 is a view, partly in cross-section, of the stationary head B and the fingers $b$. Fig. 7 is a plan view of the machine. Fig. 8 is a plan view of spoke-wire W, showing blanks and swaged portion. Fig. 9 shows cross-section of the roller-bushing $b^2$. Fig. 10 shows roller $b^3$.

Like letters refer to like parts throughout the several views.

In the drawings illustrating the devices of my invention and the best mode now known to me of arranging and applying the same (see Figs. 1 and 2) the standard A supports the stationary head B, which is the outer casing of the swaging device and is firmly held to the standard A by the cap A' and the bolts $a$ $a$ and nuts $a'$ $a'$ or in any other suitable manner. The standards and frame $A^3$ support the working parts of the feeding and shearing devices described below.

G is a driving-pulley splined at $g$ on the hub $g'$ of the fly-wheel G', and $G^2$ is a loose pulley on the same hub $g'$. The fly-wheel G', through its hub $g'$, is fast on the tubular shaft H, through the center of which and for its entire length is the wire-passage $h$ of suitable diameter for the passage of the wire to be operated upon. The inner end of the wire-passage $h$ is preferably contracted to the diameter of the wire W in order to guide it properly to the swaging-dies $J^2$.

B' is a steel band shrunk on the inner end of the stationary head B over the fingers $b$ to increase the resistance of fingers $b$ to the force of the hammering and swaging blows and to reinforce the blocks $b'$.

The stationary head B, containing the swaging device, is constructed as follows, (see Fig. 3:) The inner face of the stationary head B is formed with a plurality of fingers $b$, in the spaces between which are mounted reinforcing-blocks $b'$, (of hardened steel,) against which rest cylindrical bushings $b^2$, (of hardened steel,) which are formed with lengthwise openings in their inner faces. These bushings $b^2$ contain rollers $b^3$, (of hardened steel,) which slightly project into the central chamber $b^4$ of the stationary head B. (See Fig. 3.) The tubular shaft H (see Fig. 2) projects into said chamber $b^4$ and is provided at its inner end with a head or boss $h'$, grooved transversely at $h^3$ across its face, the opposite sides of the groove being equidistant from the middle of the boss $h'$ and coincident with the lengthwise axis of the tubular shaft H. The head or boss $h'$ is centrally and axially recessed to receive the bushing $h^2$, which is set loosely in said recess. The bushing $h^2$ is grooved across its face transversely and centrally to agree with the groove across the face of the head or boss $h'$, and the inner end of the said bushing $h^2$ is centrally perforated for the wire as the same is fed into the machine. The bushing $h^2$ receives the greater proportion of wear and is renewable. The hammers J, the wedges J', and the swaging-dies $J^2$ are loosely mounted in the grooves $h^3$ of the boss $j'$ and bushing $h^2$, the hammers J and dies $J^2$ being actuated by the successive contact of the cam-shaped ends $j$ of the hammers J with the inwardly-projecting peripheries of the rollers $b^3$. The wedges J' are actuated by mechanism hereinafter described.

The reinforcing-blocks $b'$, the bushing $b^2$, the rollers $b^3$, the hammers J, the wedges J', the swaging-dies $J^2$, and the tubular-shaft bushing $h^2$ are all subject to rapid wear and require to be replaced with more or less frequency. To facilitate the substitution of worn parts, the elements just above mentioned are removable and are retained in their respective positions by concentric face-plates $b^5$ and $b^6$, plate $b^5$ being removably fixed to head B, and plate $b^6$ being removably fixed to the collar or boss $h'$ and rotating therewith and having suitable holes or slots $b^9$ for the reciprocation therethrough of the wedges J'.

To regulate the force of the blows delivered by the hammers J upon the dies $J^2$, I provide tapered wedges J', inserted between the hammers J and the dies $J^2$, and which are pivotally connected with the grooved revoluble wedge-carrying collar K, which has a backward-and-forward motion upon the stationary tubular support K′, the same being preferably a part of and projecting from a transverse bar $o$ of the frame $A^3$, which extends across the face and forward of the swaging devices. The collar K is actuated by the lever $K^2$, which is pivotally connected at $k$ with the cam-lever $K^3$. The cam-lever $K^3$ is fulcrumed at $k'$ on the tubular support K′. The cam-lever $K^3$ is provided with a cam-roller $k^2$, which works with the cam $K^4$. The wedges J′ are forced inwardly between the hammers J and the swaging-dies $J^2$ by the movement of the collar K toward the boss $h'$, this movement being due to the push of cam $K^4$ on the cam-roll $k^2$. When the portion $k^3$ of cam $K^4$ is against the cam-roll $k^2$, the spring $K^5$ serves to pull the wedge-carrier K and wedges J′ outwardly from their most effective wedging position, so that the cam-shaped ends $j$ of the hammers J are out of working contact with the rollers $b^3$. One end of spring $K^5$ is fast to frame $A^3$ and the other end to cam-lever $K^3$, and the spring is distended when the inward movement of the collar K occurs.

Cam-lever $K^3$ is provided with a suitable nut $K^6$ (conveniently the equivalent of a turnbuckle) to increase or decrease its length, so that a proper adjustment is secured for the insertion or withdrawal of the wedges J′ between the hammers J and the dies $J^2$. The cam $K^4$ and a cam $K^7$ and a worm-gear $K^8$ are each supported on shaft $K^9$, which is actuated through the worm $K^{10}$, (see Fig. 7,) the shaft $K^{11}$, which carries the worm $K^{10}$, passing through suitable bearings in the frame $A^3$ and the standard A and being provided with suitable driving-pulleys $K^{12}$ and $K^{13}$. These pulleys are of different diameters to secure different speeds for shaft $K^{16}$ and are each mounted on a hub $K^{14}$, loose on the shaft $K^{11}$, which is adapted to be coupled to the hub $K^{15}$, which is fast on shaft $K^{11}$.

Cam-shaft $K^9$ (see Figs. 2, 4, and 5) carries a rocker-arm $K^{16}$, which has a lengthwise slot $k^4$, in which there is an adjusting-block $k^5$, which is adjusted in its slot by the adjusting-screw L. This block $k^5$ is pivotally connected by a pin $l$ with a slide-block L′, mounted in the lengthwise slot $l'$ of the rocker-lever $L^2$, which is pivoted at $l^2$ to the base of the machine. The upper end of rocker-lever $L^2$ is loosely jointed at $l^3$ with the connecting-rod $L^3$ for carriage D′. That end of the rocker-lever $L^2$ with which the connecting-rod $L^3$ is thus connected is furnished with a lengthwise opening $l^4$, in which a spring $l^5$ is mounted rearwardly of the pin $l^3$. The other end of the connecting-rod $L^3$ is adjustably connected to the carriage by means of the clamp-bolt $l^6$ through the elongated slot $l'$. By this adjustment the position of the carriage in relation to the wire is regulated independently of the adjustment of the slide-block L′. Rocker-lever $L^2$ is provided with an abutment $l^8$, which on the back stroke of the rocker-lever $L^2$ strikes slide-bar $L^4$, carrying an inclined shoe $l^9$, which coöperates with the inclined block $l^{10}$ in the vertical slide-bar $l^{11}$ and serves to pull the slide-bar $l^{11}$ downwardly against the stress of a spring $l^{12}$, mounted above the horizontal abutment $l^{13}$, through which the slide bar or rod $l^{11}$ passes, the rod being provided with a fixed collar $l^{14}$ to engage the upper end of the spring $l^{12}$. The upper end of the slide-rod $l^{11}$ extends into the path of an abutment $l^{15}$ on the bottom of the carriage D′. On the back stroke of the carriage the pin $l^3$ engages the spring $l^5$ in the outer end of the connecting-rod $L^3$ and compresses it slightly. As this spring is compressed the shoe $l^9$ moves the slide-rod $l^{11}$ downwardly and out of the path of abutment $l^{15}$, so that the carriage D′ moves again and carries the wire which has been operated on and is still clamped by the jaws $D^2$ $D^3$ (on carriage D′) a distance equal to that portion of the spoke which is called the "blank." The carriage on its back stroke is first brought to rest by engagement of abutment $l^{15}$ with the upper end of the slide-rod $l^{11}$. It is at this time that the wire ceases to move lengthwise and that the swaging-dies $J^2$ form the shoulder $x'$, (see Figs. 2 and 8,) the swaging-dies $J^2$ acting during the interval that the wire is at rest to form a nicely-finished shoulder $x'$ instead of a more or less imperfectly-formed shoulder, as would happen if the wire were moved continuously. The interval required for compressing the spring $l^5$ and pulling the slide-bar $l^{11}$ out of the path of abutment $l^{15}$ practically corresponds to the interval required to form the shoulder $x'$, and when the shoulder $x'$ is completed the carriage moves on to its outermost limit, the extent of this movement corresponding to the length of the blank.

The jaws $D^2$ $D^3$ are loosely pinned at their butt-ends to the upright $d$ of carriage D′, the free end of one jaw facing the free end of the other jaw and both jaws pointing toward the swaging mechanism. The range of movement of one of the jaws is limited by a stop $d'$, mounted in a bracket $d^2$ of the carriage D′. The other jaw, which is opposite its mate, is moved toward the wire to clamp it by the cam $d^3$ on the end of rod $d^4$, which carries a roll $d^5$, that runs in the lengthwise raceway $d^6$ of the vertically-movable frame $d^7$. This frame $d^7$ is guided in vertical ways $d^8$ $d^9$ in the frame $A^3$. Frame $d^7$ is provided with a dependent cam-roll $d^{10}$, which works with the cam $K^7$. When the cam $K^7$ is in operative position, the frame $d^7$ is at its lowest position, falling downward in its ways by gravity and the under jaw $D^2$ then gravitating away from the wire W. When the swell of the cam $K^7$ rises against the cam-roll $d^{10}$, the frame $d^7$ is lifted, carrying the under jaw $D^2$ against the wire W and clamping it against the upper jaw $D^3$. The dependent cam-roll $d^{10}$ is adjustable on the frame $d^7$ in order to suit wires of different diameters, the adjusting-screw $d'$ serving, with the adjustable cam-roll $d^{10}$, to regulate the jaws to wires of different diameters and also to so adjust the jaws that their working ends are operative on work kept central in relation to the swaging mechanism.

To secure any desired length of blank in a given length of spoke, the carriage D′ is formed with a lengthwise slot $d^{11}$, and the upright $d$, to which the jaws $D^2$ $D^3$ are pivoted, is provided with a horizontal side plate $d^{12}$, through which a clamp-bolt $d^{13}$ passes into and through the slot $d^{11}$. Carriage D′ is provided with a horizontal slide plate $f$, having a lengthwise slot $f'$, through which a clamping-screw $f^2$ extends to lock the plate in adjusted position on the carriage. This plate $f$ carries an upright $f^3$, in which is mounted the wire-guide $f^4$, this guide having a hole through it for the passage of the wire W. One of its functions is that of a shear-blade. The movable member $f^5$ of the shearing mechanism is a vertically-reciprocating bar having a hole through it for passage of the wire, and when the movable member slides upwardly, the wire being through the hole in guide $f^4$ and also through hole in member $f^5$, the wire is cut off, as will be readily understood. Cutting member $f^5$ is actuated by the rocker-lever $f^6$, fulcrumed on a stud $f^7$ on the carriage D′. One arm of the rocker-lever $f^6$ works in a hole in the movable cutting member $f^5$, and its outer end is provided with a roller $f^8$, which runs in the raceway $d^6$ of the vertically-movable frame $d^7$. The up-and-down motions of this frame $d^7$ effect the requisite reciprocations of the movable cutting member $f^5$.

Carriage D′ is movable lengthwise of the machine toward and away from the swaging mechanism and is mounted on ways $d^{18}$ in frame $A^3$.

Considering the mechanism in the position shown in the drawings, a spoke is supposed to have been just severed at the middle of a blank-section of the wire, the movable cutting member $f^5$ is just returned to its position of rest, and the jaws $D^2$ $D^3$ released from the wire, so that the carriage is free to carry the jaws and the severing mechanism toward the swaging mechanism, through which it is supposed the second of two continuous blank-sections has just been drawn. These two continuous blank-sections are marked $x^3$ and $x^4$ in Fig. 2. The carriage now moves back toward the swaging-head and the wedges enter inwardly between the hammers and dies to the full extent provided and the jaws pass over the wire, which passes outward through the coincident holes in the wire-guide $f^4$ and the hole in the movable cutting member $f^5$. When the carriage reaches the limit of its inward movement, jaws $D^2$ $D^3$ seize at or nearly on the swaged portion of the wire, and at the same instant the shearing device is actuated and severs the spoke just pulled through by the feeding device, and the carriage now moves back with the wire, which is being constantly hammered or swaged as it is pulled through the swaging mechanism, until the abutment $l^{15}$ strikes the stop or slide rod $l^{11}$. Then, as above described, the carriage takes a fresh start rearward and the swaging-dies stop work, allowing the formation of two continuous blanks. The jaws are again opened and the carriage moves inward to grasp and pull another spoke and the operations are repeated.

The main advantages of the herein-described machine are the simplicity of the construction of the swaging-head, permitting quick and easy renewal of worn parts and the momentary stopping of the carriage while the second shoulder is being formed and the subsequent completion of the back stroke of the carriage at the same rate of speed that it had at the first part of its rearward movement. Heretofore the final movement of the carriage has been accelerated just before the second shoulder was finished, with the result that the wire was carried too swiftly to permit proper swaging of the spoke about an inch in front of the second shoulder, this part of the spokes heretofore swaged being characterized by a rough or ridge-like conformation, deemed highly objectionable by those skilled in the art.

I claim as my invention—

1. In a swaging-machine, the combination with a stationary head having a plurality of fingers, of reinforcing-blocks and of bushings, a reinforcing-band surrounding and binding said parts together, rollers contained within said bushings, a boss formed with a groove, a tubular shaft rotating within said stationary head and carrying said boss, hammers sliding in the outer part of said groove, swaging-dies sliding in the inner part of said groove, wedges entering said groove between said hammers and said dies, a wedge-carrying collar, a tubular shaft for the same, a slide controlling said collar, a lever for operating the slide, a cam controlling said lever, and means to rotate said cam, substantially as specified.

2. In a swaging-machine, the combination with the boss formed with a transverse groove, the hammers and swaging-dies and intermediate wedges therein, and means for operating the same, of the stationary head surrounding the swaging devices and having a plurality of fingers integral with and projecting from the said head, reinforcing-blocks fixed between the said fingers, cylindrical bushings between and backing against the fingers and the reinforcing-blocks, and rollers within the bushings and against which rollers the hammers strike in the operation of the swaging devices, substantially as set forth.

3. In a swaging-machine, the combination of a supporting-frame, swaging mechanism, coacting jaws, a jaw-carrying carriage, mechanism for reciprocating said carriage, mechanism for temporarily arresting said carriage at an intermediate point in its travel while said swaging mechanism is in operation, and mechanism for releasing the carriage from said arresting means and completing the movement of said carriage in the same direction from said intermediate point to the end of its travel, substantially as specified.

4. In a swaging mechanism, the combination of a main stationary frame, a carriage sliding in said frame, a rocker-arm, a rocker-arm shaft, means to rotate said shaft, a rocker-lever, a slide-block, means to adjust said slide-block, a link connecting said carriage and said rocker-lever, a spring interposed between said rocker-lever and said link, a lug on said rocker-lever, a slide-bar in the path of said lug, a shoe fast on said slide-bar, a slide-rod formed with a beveled foot arranged to be engaged by said shoe, a spring controlling said slide-rod, and an abutment on said carriage arranged to strike said slide-rod when the latter is extended, substantially as specified.

5. In a swaging-machine, the combination with a stationary head, rotary swaging devices therein and means for operating the same, of a transverse bar of the frame extending across the face and forward of the swaging devices, a stationary tubular support connected to the said transverse bar and projecting therefrom toward the swaging devices, a revoluble collar surrounding the said tubular support, wedges pivotally connected to the said revoluble collar and acting with the swaging devices and means for moving the said revoluble collar and the wedges longitudinally upon the said tubular support, substantially as set forth.

6. The combination in a swaging-machine, with the stationary head, the swaging devices within the same and means for operating the said swaging devices, of concentric face-plates secured to the face of the swaging-device support and rotating therewith, a transverse bar of the frame in front of the swaging devices, a tubular support integral with the transverse bar and occupying a position axially with the center of the swaging devices, the said transverse bar being perforated to agree with the opening in the tubular support, a revoluble collar upon the tubular support, wedges pivotally connected upon opposite sides of the revoluble collar and extending forward through the concentric face-plates to engage the swaging devices, and means for moving the said revoluble collar and wedges longitudinally of the tubular support, substanas and for the purposes set forth.

7. The combination in a swaging-machine with the stationary head, the swaging devices within the same and means for operating the said swaging devices, of concentric face-plates secured to the face of the swaging-device support and rotating therewith, a transverse bar of the frame in front of the swaging devices, a tubular support integral with the transverse bar and occupying a position axially with the center of the swaging devices, the said transverse bar being perforated to agree with the opening in the tubular support, a revoluble collar upon the tubular support, wedges pivotally connected upon opposite sides of the revoluble collar and extending forward through the concentric face-plates to engage the swaging devices, means for moving the said revoluble collar and wedges longitudinally of the tubular support, a lever engaging the revoluble collar and a guide therefor, a spring-actuated lever and a connection therefrom to the aforesaid lever and a cam for actuating the latter lever, substantially as and for the purposes set forth.

8. The combination in a swaging-machine with the stationary head, the swaging devices within the same and means for operating the said swaging devices, of concentric face-plates secured to the face of the swaging-device support and rotating therewith, a transverse bar of the frame in front of the swaging devices, a tubular support integral with the transverse bar and occupying a position axially with the center of the swaging devices, the said transverse bar being perforated to agree with the opening in the tubular support, a revoluble collar upon the tubular support, wedges pivotally connected upon opposite sides of the revoluble collar and extending forward through the concentric face-plates to engage the swaging devices, and means for moving the said revoluble collar and wedges longitudinally of the tubular support, a lever engaging the revoluble collar and a guide therefor, a spring-actuated lever and a connection therefrom to the aforesaid lever, and a cam for actuating the latter lever, and means substantially as specified for adjusting the cam-lever with reference to the cam and for adjusting the relation of the cam-lever to the other lever for controlling the action of the wedges, substantially as set forth.

9. In a swaging-machine, the combination with the stationary head, of a tubular shaft and integral head or boss at one end of said tubular shaft revoluble in the said stationary head, the face of the said head or boss being centrally and transversely grooved and provided with a central axial recess, a bushing $h^2$ adapted to fit said central recess, the said bushing being transversely grooved to agree with the transverse groove in the boss or head and centrally and axially perforated, hammers fitting and sliding in the transverse groove of the said head or boss, swaging-dies fitting and sliding in the transverse groove of the said bushing $h^2$, and wedges entering the said transverse groove between the hammers and dies, and means for supporting the wedges and for revolving the said tubular head its boss and the bushing $h^2$, substantially as and for the purposes set forth.

Signed by me this 7th day of March, 1900.

FRANK VINCENT WHYLAND.

Witnesses:

A. G. GOLDTHWAIT,

M. L. DAVIS.